United States Patent
Kassemi et al.

(10) Patent No.: US 12,248,931 B2
(45) Date of Patent: Mar. 11, 2025

(54) AUTOMATED APPLICATION PROGRAMMING INTERFACE (API) SYSTEM AND METHOD

(71) Applicant: SWOOP IP HOLDINGS LLC, Wilmington, DE (US)

(72) Inventors: James Kassemi, Albuquerque, NM (US); Lawrence Glen Holcomb, Albuquerque, NM (US); Dave Walz-Burkett, Albuquerque, NM (US); John P. Killoran, Jr., Albuquerque, NM (US); Nora Zulick, Albuquerque, NM (US); Mike Cassio, Greenwood Village, CO (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 0 days.

(21) Appl. No.: 18/370,730

(22) Filed: Sep. 20, 2023

(65) Prior Publication Data

US 2024/0020686 A1 Jan. 18, 2024

Related U.S. Application Data

(63) Continuation of application No. 17/699,692, filed on Mar. 21, 2022, now Pat. No. 11,797,981, which is a
(Continued)

(51) Int. Cl.
*G06Q 20/38* (2012.01)
*G06Q 20/02* (2012.01)
(Continued)

(52) U.S. Cl.
CPC ........ *G06Q 20/3674* (2013.01); *G06Q 20/02* (2013.01); *G06Q 20/12* (2013.01);
(Continued)

(58) Field of Classification Search
CPC .................................................. G06Q 20/401
(Continued)

(56) References Cited

U.S. PATENT DOCUMENTS

| 6,175,823 B1 * | 1/2001 | Van Dusen | G06Q 30/0635 |
| | | | 705/26.81 |
| 9,495,679 B2 * | 11/2016 | Kassemi | G06Q 20/3674 |

(Continued)

*Primary Examiner* — Chinedu C Agwumezie
(74) *Attorney, Agent, or Firm* — Volpe Koenig

(57) ABSTRACT

A method for leveraging email to complete an online transaction from a third party vendor, the method comprising: storing customer information, the customer information including a customer name, customer email address, customer shipping address, and customer billing information. The method further comprises receiving an authorization request from an application programming interface associated with a third party vendor requesting access to a portion of the customer information and receiving confirmation from a customer to allow the third party vendor to access the portion of the customer information. The method further comprising transmitting an access code to the third party vendor and receiving a request message from the third party vendor, wherein the request message comprises the access code, and wherein the request message requests an authorization token. The method may further comprise confirming the received access code and transmitting an authorization token to the third party vendor.

14 Claims, 12 Drawing Sheets

Related U.S. Application Data continuation of application No. 16/820,013, filed on Mar. 16, 2020, now Pat. No. 11,282,074, which is a continuation of application No. 15/351,005, filed on Nov. 14, 2016, now Pat. No. 10,592,897, which is a continuation of application No. 14/216,198, filed on Mar. 17, 2014, now Pat. No. 9,495,679.

(60) Provisional application No. 61/791,816, filed on Mar. 15, 2013.

(51) Int. Cl.
*G06Q 20/12* (2012.01)
*G06Q 20/36* (2012.01)
*G06Q 20/40* (2012.01)
*G06Q 30/0279* (2023.01)
*H04L 51/08* (2022.01)

(52) U.S. Cl.
CPC ....... *G06Q 20/401* (2013.01); *G06Q 30/0279* (2013.01); *H04L 51/08* (2013.01)

(58) Field of Classification Search
USPC .......................................................... 705/67
See application file for complete search history.

(56) References Cited

U.S. PATENT DOCUMENTS

| | | | |
|---|---|---|---|
| 10,592,897 B2* | 3/2020 | Kassemi | G06Q 20/3674 |
| 11,797,981 B2* | 10/2023 | Kassemi | G06Q 30/0279 |
| 2012/0330736 A1* | 12/2012 | Beckner | G06Q 30/0221 |
| | | | 705/14.16 |
| 2013/0159119 A1* | 6/2013 | Henderson | G06Q 20/327 |
| | | | 705/41 |
| 2014/0207628 A1* | 7/2014 | Erez | G06Q 30/0633 |
| | | | 705/27.1 |

* cited by examiner

AUTOMATED APPLICATION PROGRAMMING INTERFACE (API) SYSTEM AND METHOD

CROSS REFERENCE TO RELATED APPLICATIONS

This application is a continuation of U.S. patent application Ser. No. 17/699,692 filed Mar. 21, 2022, which is a continuation of U.S. patent application Ser. No. 16/820,013 filed Mar. 16, 2020, now U.S. Pat. No. 11,282,074, issued on Mar. 22, 2022, which is a continuation of U.S. patent application Ser. No. 15/351,005, filed Nov. 14, 2016, now U.S. Pat. No. 10,592,897, issued on Mar. 17, 2020, which is a continuation of Ser. No. 14/216,198 filed Mar. 17, 2014, now U.S. Pat. No. 9,495,679, issued on Nov. 15, 2016 and claims the benefit of U.S. Provisional Application No. 61/791,816 filed on Mar. 15, 2013, which are incorporated by reference as if fully set forth.

FIELD OF INVENTION

The present invention is related to e-commerce.

BACKGROUND

Many companies purchase software as a service (SaaS), platform as a service (PaaS), Infrastructure as a Service (IaaS) or something similar. SaaS is essentially "on-demand software" supplied by software vendors where software and associated data are centrally hosted on the cloud. SaaS software can be accessed by customers using a thin client via a web browser. Similarly IaaS is a model wherein a company outsources the equipment for operation, such as storage, hardware, servers and networking components. PaaS is a model allowing customers to rent hardware, operating systems, storage and network capacity over the Internet. However, many companies and non-profit organizations do not like being tied to a monthly fee. Also, the flexibility to customize to a particular business's needs may be limited based on the rules of the SaaS, PaaS, and IaaS provides.

Methods and apparatus are desired allowing companies the flexibility to enable e-commerce transactions.

SUMMARY

The application programming interface (API) disclosed herein allows third parties to request two-click payment buttons for inclusion in HTML formatted electronic communications. The methods and apparatus disclosed herein allow the process to be automated and scaled. It also allows access control for button generation at a per-account basis.

A method for leveraging email to complete an online transaction from a third party vendor, the method comprising: storing customer information, the customer information including a customer name, customer email address, customer shipping address, and customer billing information. The method further comprises receiving an authorization request from an application programming interface associated with a third party vendor requesting access to a portion of the customer information and receiving confirmation from a customer to allow the third party vendor to access the portion of the customer information. The method further comprising transmitting an access code to the third party vendor and receiving a request message from the third party vendor, wherein the request message comprises the access code, and wherein the request message requests an authorization token. The method may further comprise confirming the received access code and transmitting an authorization token to the third party vendor.

BRIEF DESCRIPTION OF THE DRAWINGS

A more detailed understanding may be had from the following description, given by way of example in conjunction with the accompanying drawings wherein.

DETAILED DESCRIPTION

When used herein, the term "token" may refer to a sequence of byte data or a string or a file used to authenticate a transaction. A token may be one or multiple encrypted strings, files, passwords, cyphers or other data which may contain information used to perform or authenticate a transaction when sent to payment servers. These tokens may be encrypted using a public-private key encryption system. The vendor or a party with knowledge of the vendor's private key may generate an encrypted token. Alternatively, a payment system or e-commerce site may generate this token on behalf of the vendor.

Disclosed herein are processor-executable methods, computing systems, and related technologies for an automated application programming interface (API). The system and method may use an email server/account to complete an e-commerce transaction (e.g., for items/services/events/donations) for a transfer of funds from a customer to a vendor (e.g. retail site, charity, political organization or other vendor.) While the technologies described herein are discussed using e-mail as an example, they may also be applicable to similar communication mediums, such as SMS and MMS communication channels.

Figure 1:
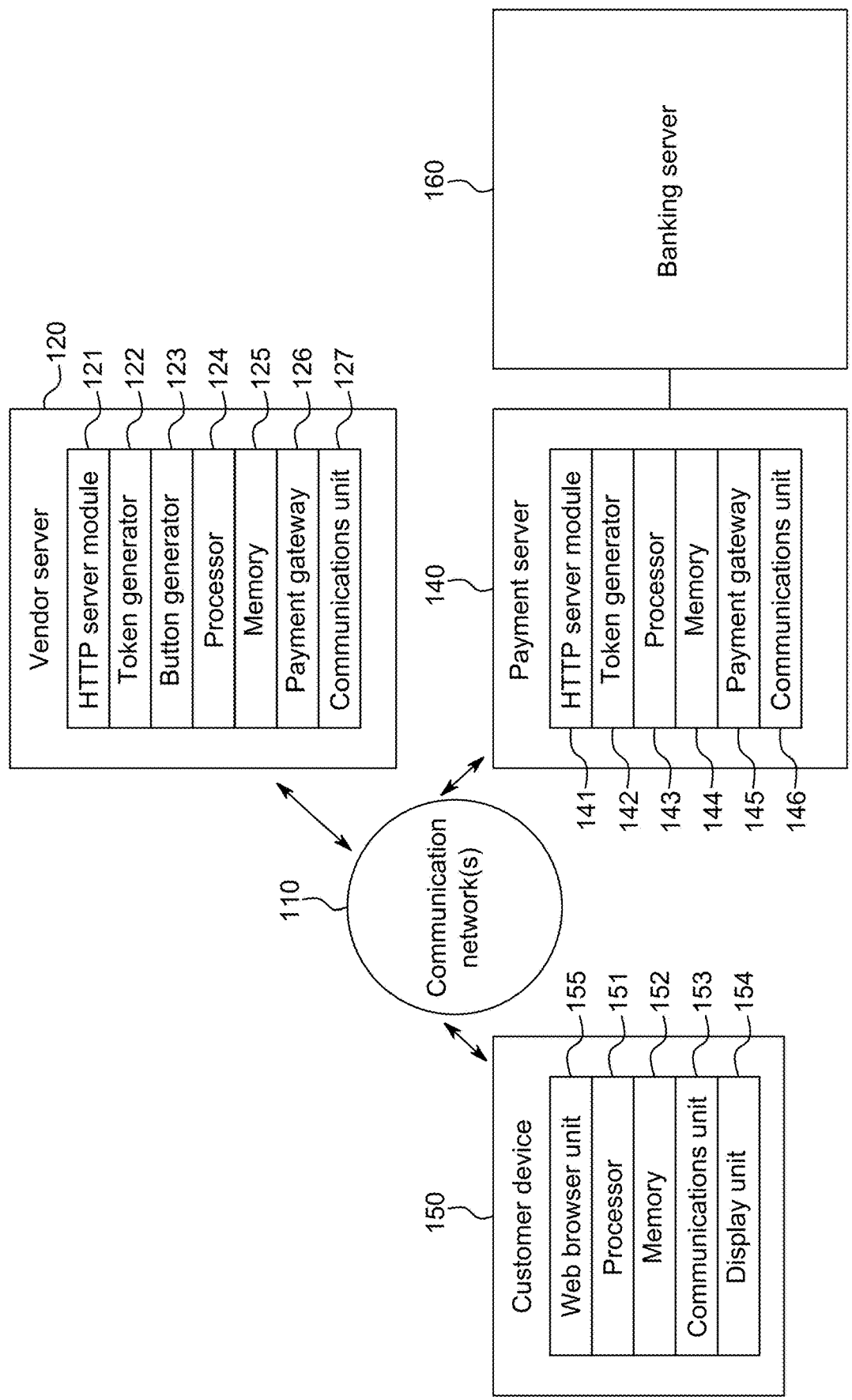
FIG. 1 shows an example system that may be utilized for e-commerce transactions.

FIG. 1 shows an example system 100 that may be utilized for email based financial transactions. The example system 100 includes a customer device 150, a vendor server 120, a payment server 140, and a banking server that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 includes a processor 151, memory 152, a communications unit 153, a display unit 154 and web browser unit 155, which may communicate data to/from the web server module(s) in the vendor server 120 and payment server 140. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in or connected to the customer device 150, such as a liquid crystal display (LCD) display or monitor. The customer device 150 may receive input from the user of the customer device 150 from input devices (not depicted) that are included in, or connected to, the customer device 150, such as a keyboard, a mouse, a microphone or a touch screen, and provide data that indicates the input to the web browser unit 155.

The vendor server 120 may include an HTTP server module 121, a token generator 122, a button generator 123, a processor 124, memory 125, a payment gateway 126 and a communications unit 127.

The HTTP server module 121 provides a website that may be accessed by a customer device 150. The HTTP server module 121 may implement the HTTP protocol, and may communicate Hypertext Markup Language (HTML) pages and related data from the website to/from the customer device 150 using HTTP. The vendor server 120 may be connected to one or more private or public networks (such as the Internet), via which the HTTP server module 121 communicates with devices such as the customer device 150. The HTTP server module 121 may generate one or more web pages and may communicate the web pages to the customer device 150, and may receive responsive information from the customer device 150.

The HTTP server module 121 may be, for example, an NGINX server APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The payment gateway 126 may be a proprietary service that directly connects with the payment processors, such as banking server 160 to handle the credit card data, and authorize credit card payments.

The token generator 122 may generate tokens for use in e-commerce transactions. Tokens may be encrypted sequence of data which contain information to perform a transaction when sent to the payment server(s) 140. Additionally or alternatively, a token may be one or multiple encrypted strings, files, passwords, cyphers or other data which may contain information used to perform or authenticate a transaction. A token may include one or more of the following parameters or other parameters not listed below:

a) private-key: The private key provided by the payment server 140.

b) public-key: Payment server's 140 public key, provided by the payment server 140.

c) partner-id: The partner ID provided by the payment server.

d) environment: The environment the vendor wants to generate buttons for. This distinguishes whether the token is being used in a testing environment or in the live environment (and running real transactions).

e) config: The path to a configuration file in yml format. This may hold a default set of information, e.g., private_key, public_key, partner_id, and other information—so they don't have to be entered separately each time a token is generated. The config field may also contain information specific to an offer (e.g. dollar amount) or a customer (like the card token) if multiple tokens are being generated with similar components.

f) type: The type of token to generate (site, email, universal). There are multiple types of tokens that a token generator can generate and decode. For example, site tokens may be used for website transactions, email tokens for two-click email payments, and universal tokens for email validations.

g) card: The card token associated with the recipient of this token. When a customer is registered with the payment server 140, the vendor receives a credit card token—a unique identifier that references the specific card associated with that customer and vendor. When the vendor is generating a token to submit to payment server 140, they may include the card token as a customer identifier.

h) email: The email associated with the receipt of this token.

i) URL: The Signup URL the recipient should go to if customer doesn't have payment information registered with payment server 140.

j) amount: The amount a user should be charged for the transaction the token is generated for.

k) user-data: Data to pass back as a reference. This data may include custom data that the vendor may want to pass through the payment server 140 and receive back when a transaction has completed. It may include an item reference number or SKU, customer address, or other piece of data that is not required by payment server 140 to complete a transaction, but that the vendor wants associated with that transaction.

l) expires: Expiration date for token, integer value of seconds since epoch.

m) header-user-agent: The HTTP_USER_AGENT from the request header. HTTP headers are sent as part of a request from a customer's web browser unit 155 for a piece of information. These headers define the parameters that the web browser unit 155 is expecting to get back. The user-agent is the identifier of the software that is submitting the request—typically the identifier of the web browser unit 155 that is requesting the content.

n) header-accept-language: The HTTP_ACCEPT_LANGUAGE from the request header. The accept-language is the acceptable language for the response—e.g. the language in which the web browser unit 155 is requesting the content be sent back.

o) header-accept-charset: The HTTP_ACCEPT_CHARSET from the request header. The accept-charset is the character sets that are acceptable for the response—e.g. the character set in which the web browser unit 155 is requesting the content be sent back.

p) ip-address: The IP address of the token recipient.

To confirm an e-commerce transaction via email, the customer sends an email embedded with a token to the payment server's 140 address. The system 100 is designed to allow the vendor flexibility to offer deals for a limited time or number or responsive to available inventory. For example, the token may be configured to expire by default after two weeks, or any predetermined time, or never expire. The vendor server 120 may be configured to extend or shorten the expiration time of a particular offer associated with a token without resending an email or generating a new token. Also, the vendor server 120 may send email updates for an offer associated with a token. This may be predetermined, or may be later set, depending upon demand by customers. Additionally, the vendor server 120 may generate groups of token values that may automatically invalidate members of the group when one token is processed. This is useful when sending out multiple tokens via email to a single customer or when sending out tokens to multiple customers, but when the vendor wants only one or a predetermined number of tokens to be processed. Therefore when these predetermined number of tokens are used, the other tokens are invalidated, effectively rescinding the offered deal. The vendor server 120 may further be configured to send email notifications that the previously submitted token is now invalid.

The button generator 123 may create cross-client and cross-browser compatible buttons for e-commerce transactions. In one embodiment, the button generator 123 may include the token generator 122 to automatically generate an associated token for each button that is created. As discussed in greater below, the token generator 122 and button generator 123 may be configured to access an API that is stored in memory 125 and controlled by processor 124.

The vendor server 120, using the API, as disclosed herein may communicate with the payment server 140 to provide information to the button generator 123 and the token generator 122. A button and an associated token, generated by the button generator 123 and/or the token generator 122 may be embedded on a web page created by the HTTP server module 121.

The memory 125 may be configured to store information associated with e-commerce transactions. This may include inventory information, information used to generate web pages, customer information, and other e-commerce data.

The payment server 140 may include an HTTP server module 141, a token generator 142, a processor 143, memory 144, payment gateway 145 and a communications unit 146. While only one vendor server 120 is shown communicating with the payment server 140, this is shown as only an example but there may be many payment servers 140. Payment server 140 may communicate with multiple vendor servers 120. A customer, wishing to use the services of the payment server 140, may register his/her email address and payment information with the payment server 140. Similarly, vendors may register with the payment server 140. The payment server 140 may provide the vendor server 120 with a public_key and private key to be used in token transaction in accordance with the methods described herein. When a transaction is attempted, the payment server 140 decodes the token, authenticates the sender of the email, and may process the transaction. While the payment server 140 is depicted as a separate entity in FIG. 1, this is shown as an example only. The payment server 140 may be controlled and/or co-located with the vendor server 120, the banking server 160.

The banking server 160 may be controlled by a third party system bank. The payment server 140 may communicate with the banking server 160 to verify that the customer has adequate funds or credit for the requested purchase. For example, the banking server 160 may be a controlled by VISA, AMERICAN EXPRESS, MASTERCARD or any other bank or banking or financial network that a customer may use for online payment. The banking server 160 may be a server for virtual currencies, such as BITCOIN, etc.

Figure 2:
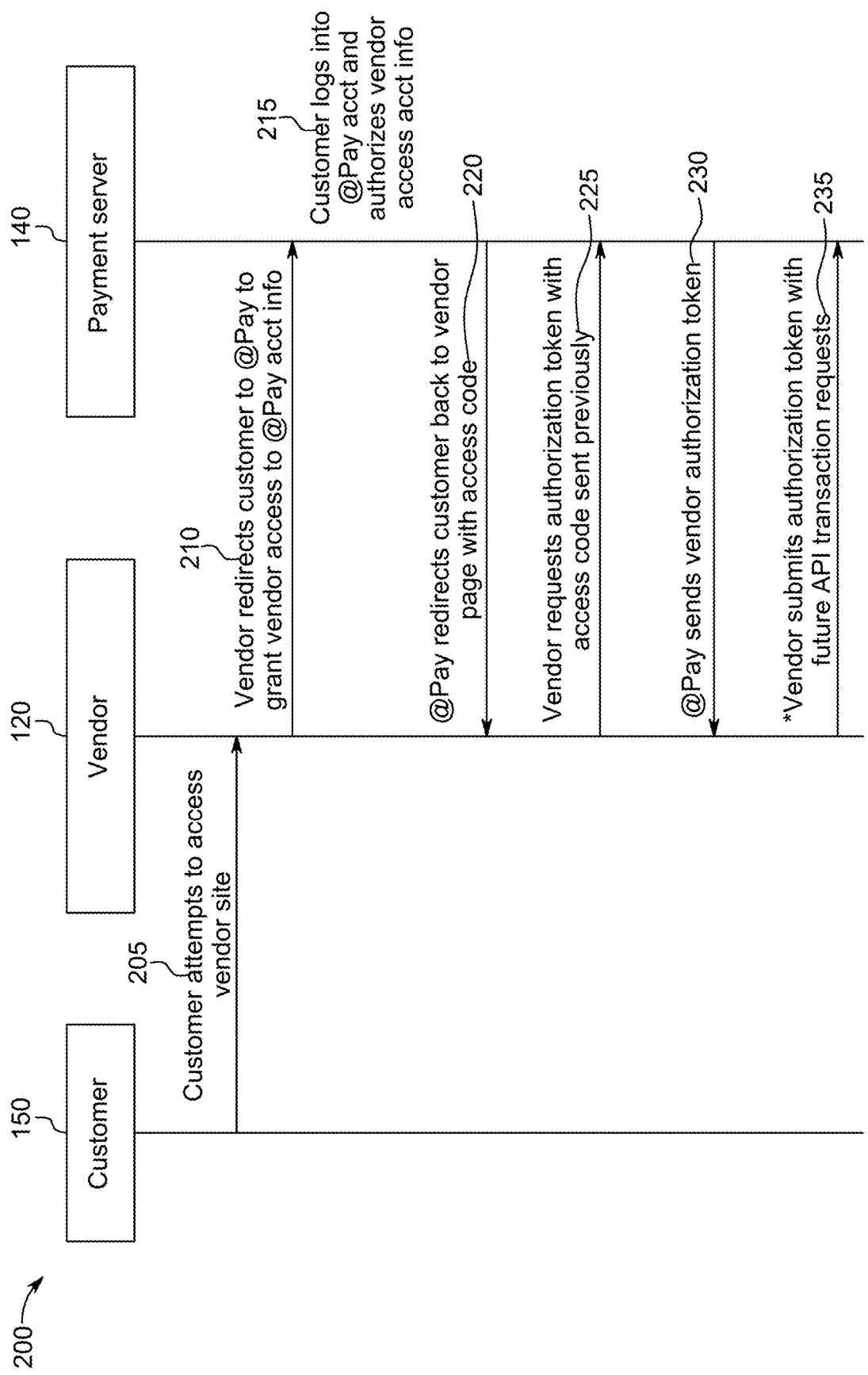
FIG. 2 shows a flow diagram for a method for implementing an API interface.

FIG. 2 shows a flow diagram for a method 200 for implementing an API interface. A customer, using a customer device 150 may attempt to access a vendor website (step 205). The vendor website may be a website selling retail goods or services or soliciting donations. The vendor website is redirected to the payment server 140, to grant the vendor access to the customer's account information (step 210). Once the customer is redirected to this website, the customer logs into the payment server account and authorizes the vendor to access the customer's account information (step 215). The payment server 140 redirects the customer back to the vendor server 120 with an access code (step 220). The vendor server 120 requests an authorization token with the previously sent access code (step 225). The payment server 140 sends the vendor server 120 an authorization token (step 230). The vendor server 120 may then submit an authorization token with future API transaction requests (step 235).

Figure 3:
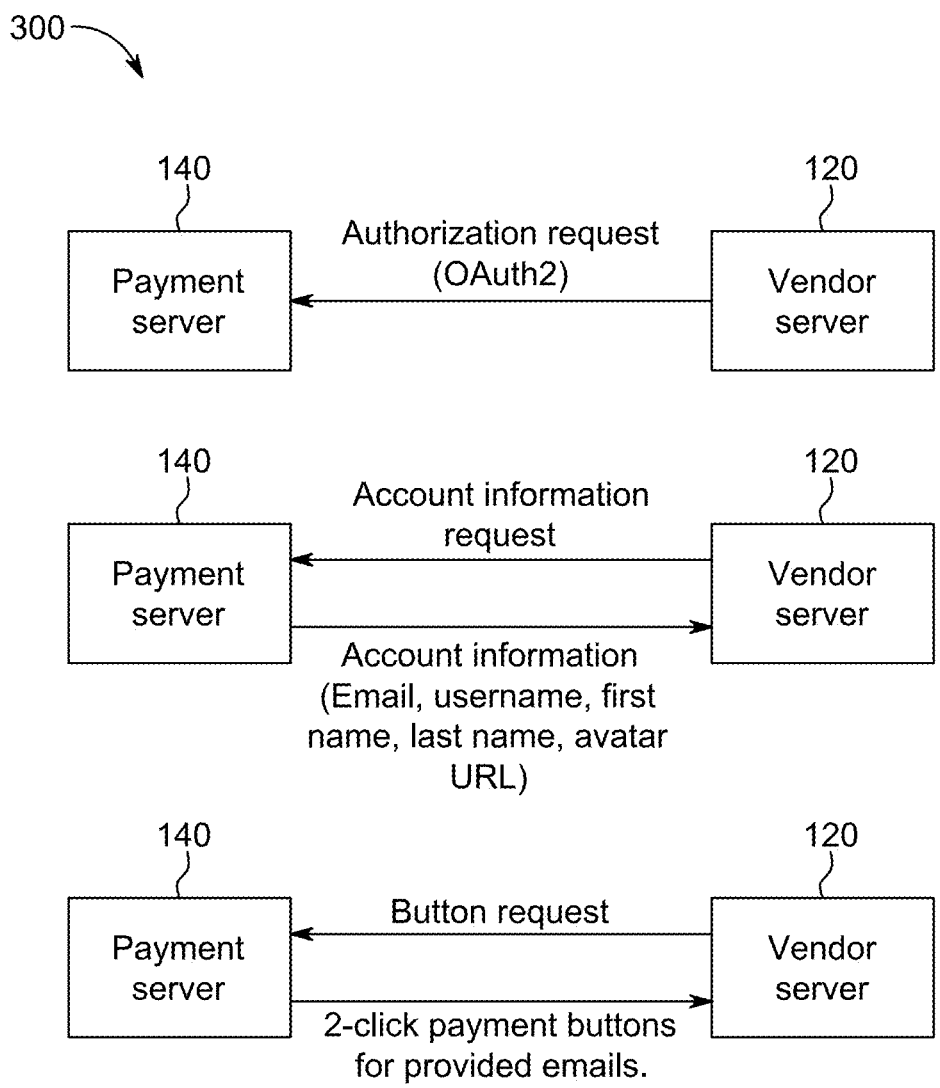
FIG. 3 shows communication between a payment server and a vendor server.

FIG. 3 shows communication between a payment server 140 and a vendor server 120. Referring to FIG. 3 the API allows a vendor server 120 to request permission from a user to perform operations using their account, securely retrieve basic account information if the user has granted permission, such as: 1. Avatar URL; 2. First Name; 3. Last Name; 4. Email Address; and 5. Username. This is performed by the API transmitting an authorization request to the payment server. As an example, in FIG. 3, the vendor server may use OAuth 2.0. OAuth is an open standard for authorization that allows the vendor server 120 to access the payment server 140 resources on behalf of the customer. OAuth may also provide a process for customers to authorize third-party access resources without sharing their credentials (typically, a username and password pair), using user-agent redirections.

Also shown in FIG. 3, the API also permits the vendor server 120 to securely generate two-click payment buttons for a customer that has granted permission, from a list of recipient email addresses. The vendor server 120 transmits an account information request to the payment server 140, for an account associated with a customer. The payment server 140 responds by providing the vendor server 120 with a customer's account information, such as email, username, first name, last name, and an avatar URL. The vendor server 120 may request a button, and the API provides information for the inclusion of payment buttons in content not being generated directly by payment server 140.

The API enables an exchange of information between any business entity and payment server 140, extending a business' application's capabilities with two-click payment technology.

The API may perform an entire transaction invoicing system, and may be applied to any similar email payment technologies. In addition, the API may be used within other companies email marketing systems for the creation of different workflows.

With authentication, there may be a secure workflow, but the email may not be encrypted. In an alternative embodiment, the email may use DomainKeys Identified Mail (DKIM) and/or Sender Policy Framework (SPF) technology. DKIM provides a method for validating a domain name identity that is associated with a message through cryptographic authentication. SPM is an email validation system designed to prevent email spam by detecting email spoofing. If DKIM and/or SPF are used for authentication, then tokens unique to each user may be unnecessary.

The API provides an OAuth 2.0 authentication system and a number of endpoints that enable its users to extend an application's capabilities with, for example, a two-click transaction. The system may comprise an API developer dashboard that provides access to client configurations as well as statistical information allowing a user to have access to API performance and status on a real time basis. For example, the API Dashboard may comprise a user interface to manage API information. Clients may be able to reset security keys, add OAuth client and update Postback URL.

FIGS. 4-11 show example web pages that may be displayed by the web browser unit 155 of the customer device 150. As will be described in detail below, the web pages may include display elements which allow the user of the customer device 150 to complete e-commerce transactions from a vendor using the disclosed API, using one or more emails. The web pages may be included in a web browser window that is displayed and managed by the web browser unit 155. The web pages may include data received by the web browser unit 155 from the vendor server 120 and/or the payment server 140. The web pages may include payment transaction information.

The web browser window may include a control area 400 that includes a back button 402, forward button 403, refresh button 404, home button 405, and address field 406. The control area 400 may also include one or more additional control elements, such as bookmark page etc. The user of the customer device 150 may select the control elements in the control area 400. The selection may be performed, for example, by clicking a mouse or providing input via keyboard, touch screen, and/or other type of input device. When one of the control elements is selected, the web browser unit 155 may perform an action that corresponds to the selected element. For example, when the refresh button 404 is selected, the web browser unit 155 may refresh the page currently viewed in the web browser window.

Figure 4:
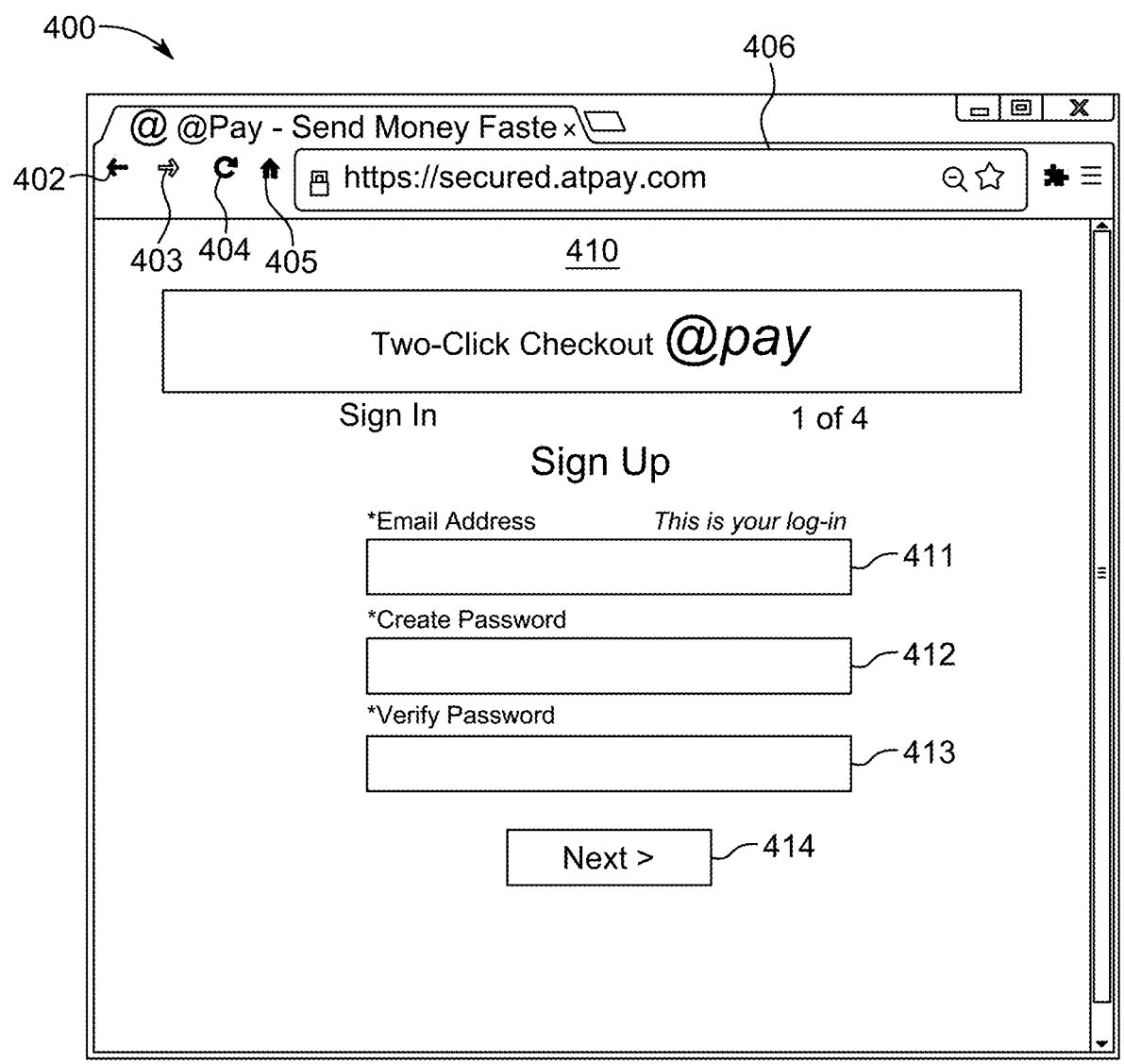
FIG. 4 is an example web page for a customer to set up an account with the payment server.

FIG. 4 is an example web page 410 for a customer to set up account with the payment server. As shown in FIG. 4, the web page may include multiple input fields 411-414. Input fields 411-413 request a customer to enter email and password information to be associated with a customer account to be created. As the customer device 150 receives input for the input fields 411-414, the web browser unit 155 may store one or more data structures that reflect the selections made in the input fields. Further, as the selections are updated, the web browser unit 155 may update the web page 410 to indicate additional, or more specific, questions that may be associated with the selections. When the user selects input field 414, if there are no errors in the transmission, the customer is taken to a subsequent web page, e.g. web page 510.

Figure 5:
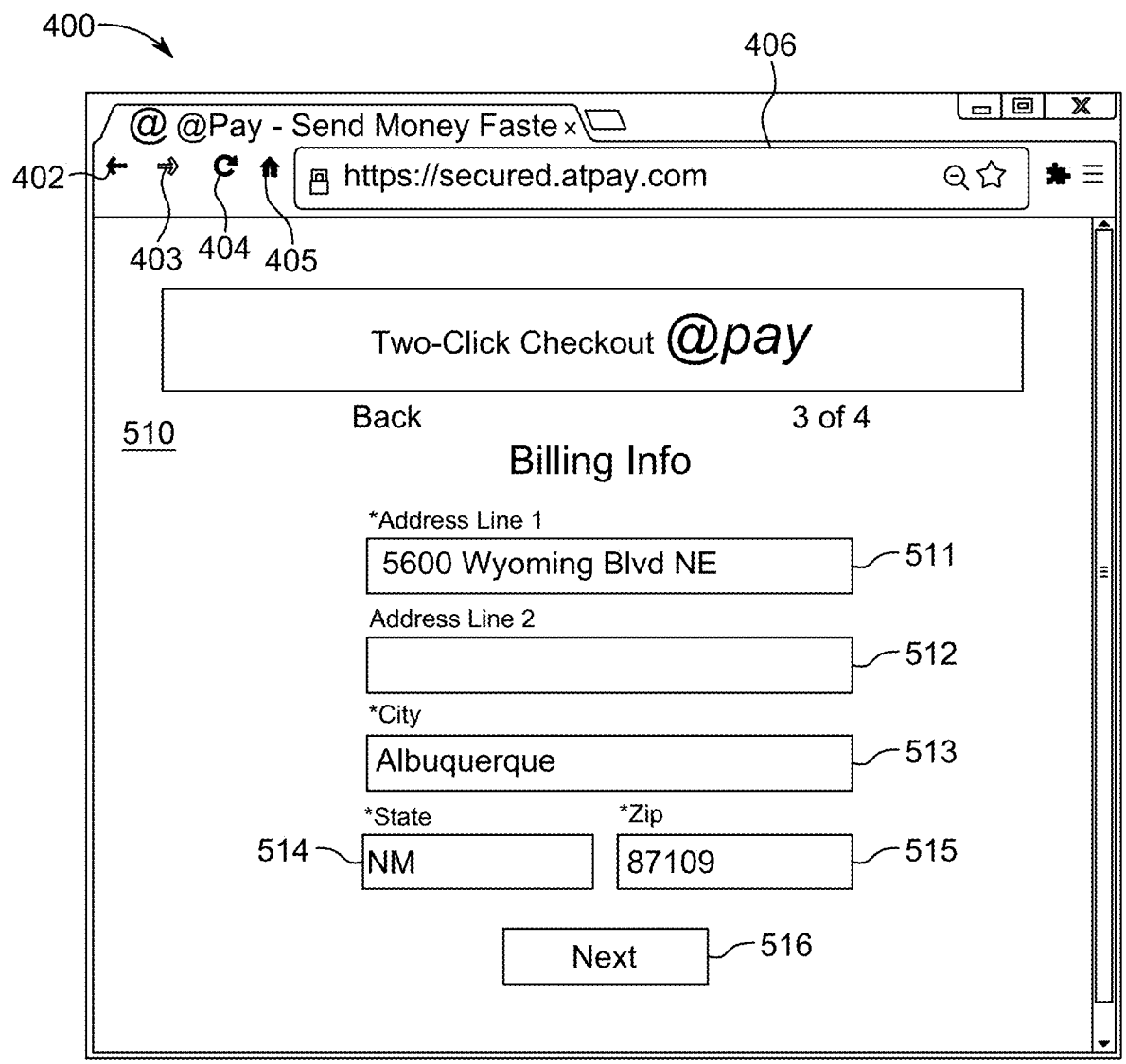
FIG. 5 is an example web page for a customer to enter billing information into the payment server.

FIG. 5 is an example web page 510 for a customer to enter billing information into the payment server 140. As shown in FIG. 5, the web page 510 may include multiple input fields 511-516. Input fields 511-515 solicit customer responses to questions regarding the customer's billing information, or more specifically, in the example shown, a billing address. As the customer device 150 receives input for the input fields 511-515, the web browser unit 155 may store one or more data structures that reflect the selections made in the input fields. Further, as the selections are updated, the web browser unit 155 may update the web page 510 to indicate additional, or more specific, questions that may be associated with the selections. When the user selects input field 516, if there are no errors in the transmission, the customer is taken to a subsequent web page, e.g. web page 610.

Figure 6:
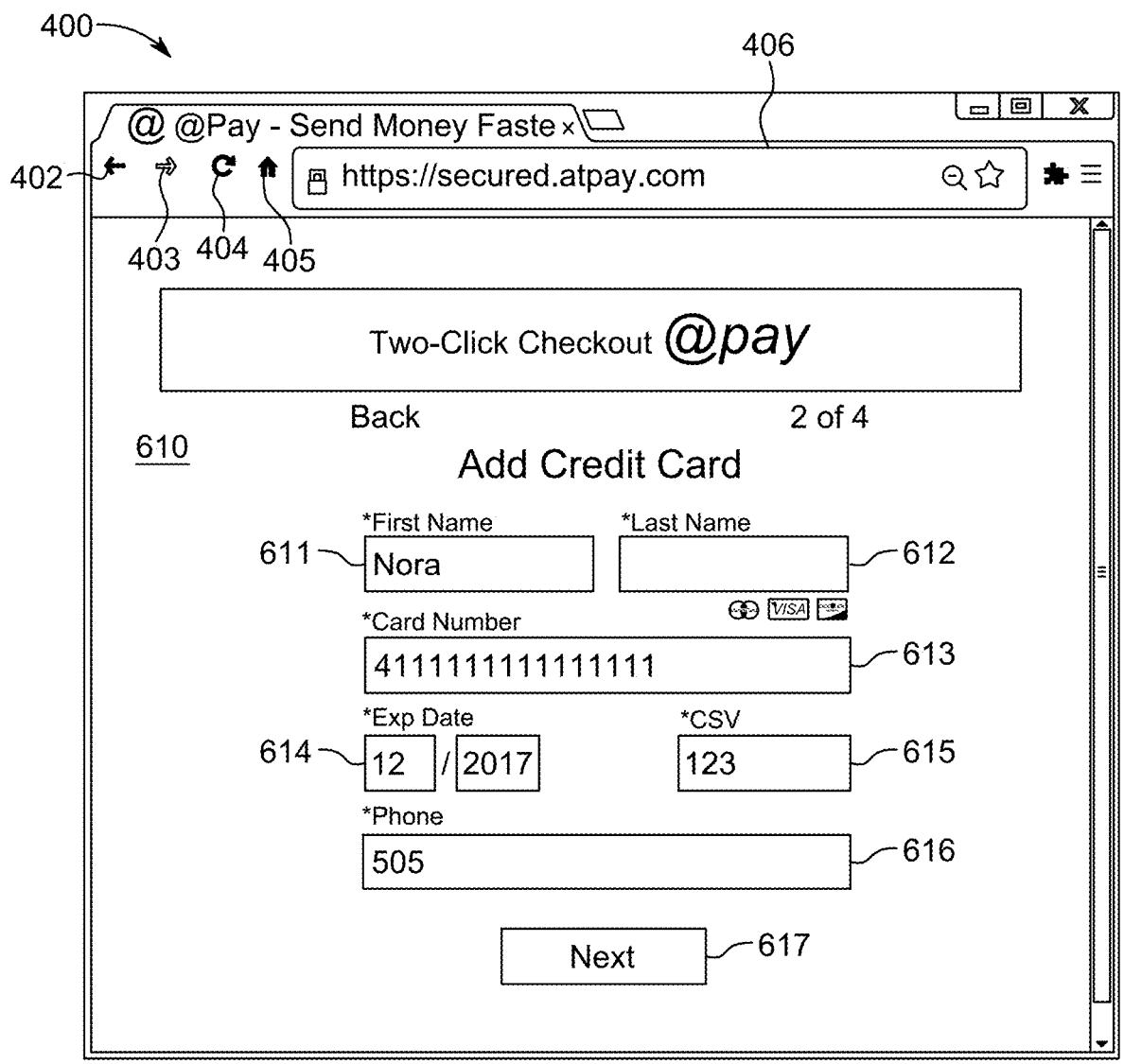
FIG. 6 is an example web page for a customer to enter credit card information into the payment server.

FIG. 6 is an example web page 610 for a customer to enter credit card information into the payment server 140. As shown in FIG. 6, the web page 610 may include multiple input fields 610-617. Input fields 611-616 solicit the customer to submit credit card information. As the customer device 150 receives input for the input fields 610-617, the web browser unit 155 may store one or more data structures that reflect the selections made in the input fields. Further, as the selections are updated, the web browser unit 155 may update the web page 610 to indicate additional, or more specific, questions that may be associated with the selections. When the user selects input field 617, if there are no errors in the transmission, the customer is taken to a subsequent web page, e.g. web page 710.

Figure 7:
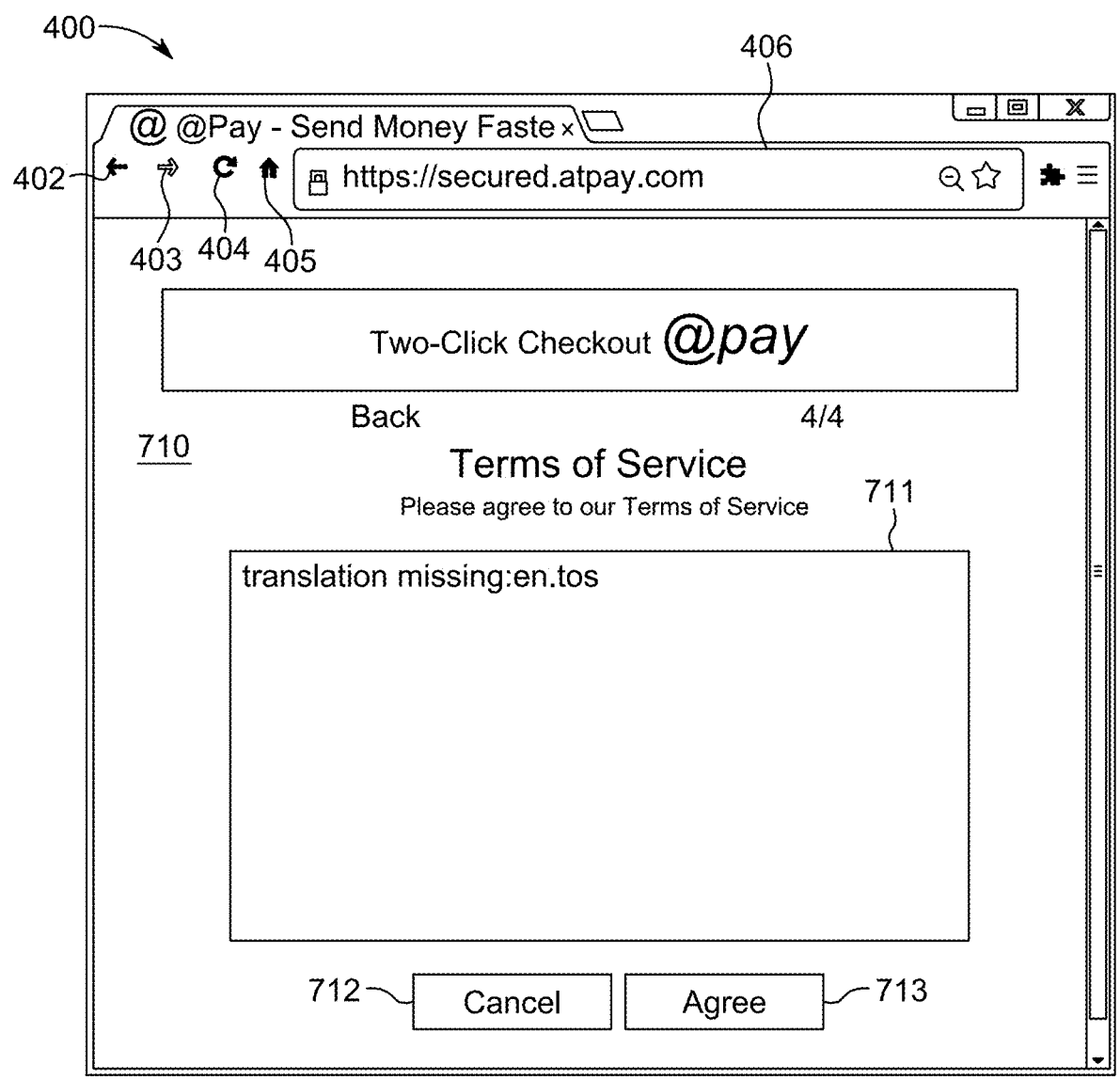
FIG. 7 is an example web page for a customer to agree to terms of service of the payment server.

FIG. 7 is an example web page 710 for a customer to agree to terms of service of the payment server 140. As shown in FIG. 7, the web page 710 may include input buttons 712 and 713. This page may or may not be optional. Once the customer has reviewed the Terms of Service in field 711, the customer may select input button 712 or 713. As the customer device 150 receives input for the input buttons 712 or 713, the web browser unit 155 may store one or more data structures that reflect the selections made in the input buttons. Further, as the selections are updated, the web browser unit 155 may update the web page 710 to indicate additional, or more specific, questions that may be associated with the selections. When the user selects input field 713, if there are no errors in the transmission, the customer is taken to a subsequent web page, e.g. web page 810.

Figure 8:
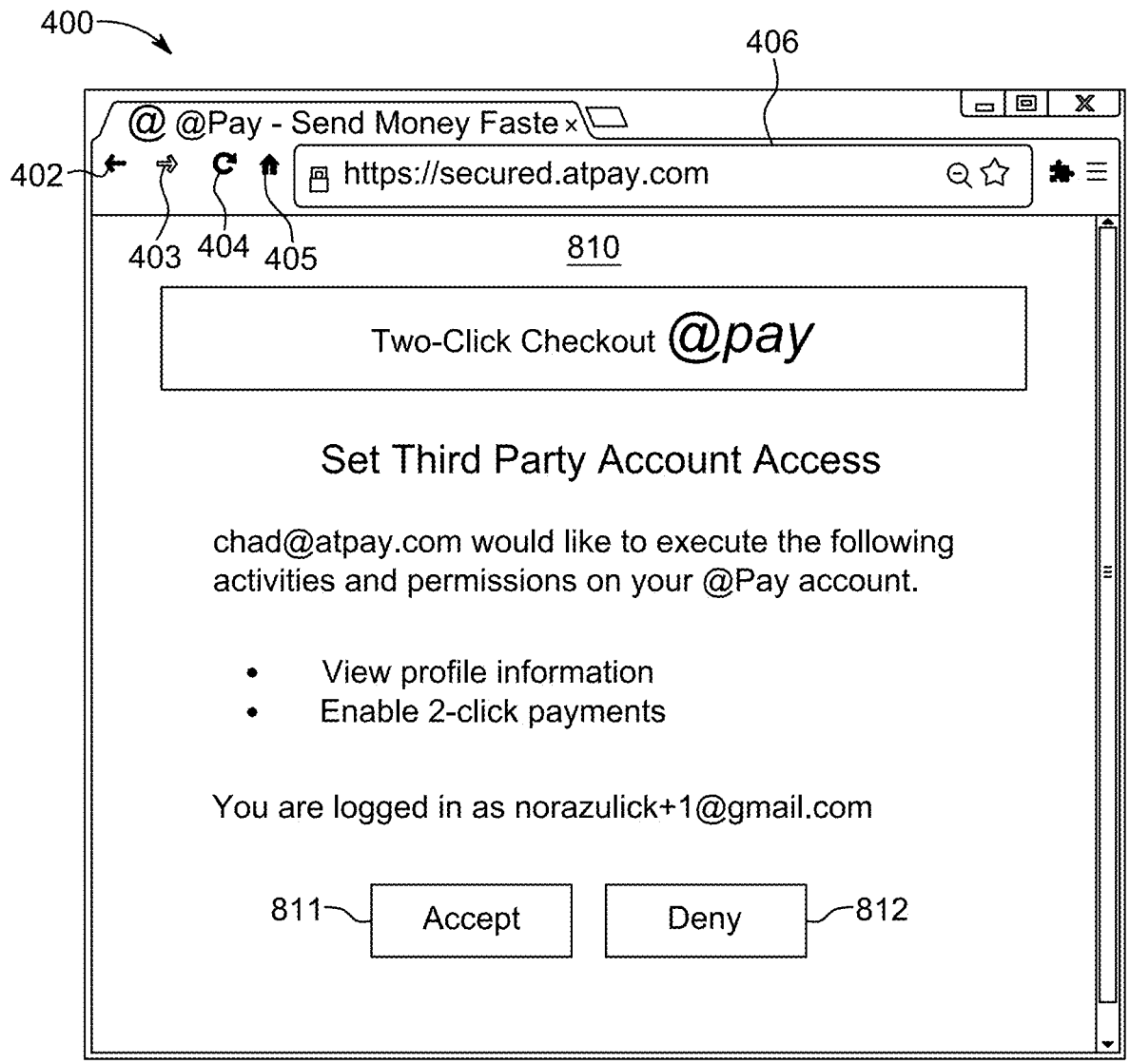
FIG. 8 is an example web page for a soliciting permission to share information with a third party.

FIG. 8 is an example web page 810 for a soliciting permission to share information with a third party. As shown in FIG. 8, the web page 810 may include input buttons 811 and 812. A question is presented on web page 810 requesting the customer's permission to set third party account access for use with the email payment system. As the customer device 150 receives input for the input buttons 811 or 812, the web browser unit 155 may store one or more data structures that reflect the selections made in the input buttons 811, 812. Further, as the selections are updated, the web browser unit 155 may update the web page 810 to indicate additional, or more specific, questions that may be associated with the selections.

Figure 9:
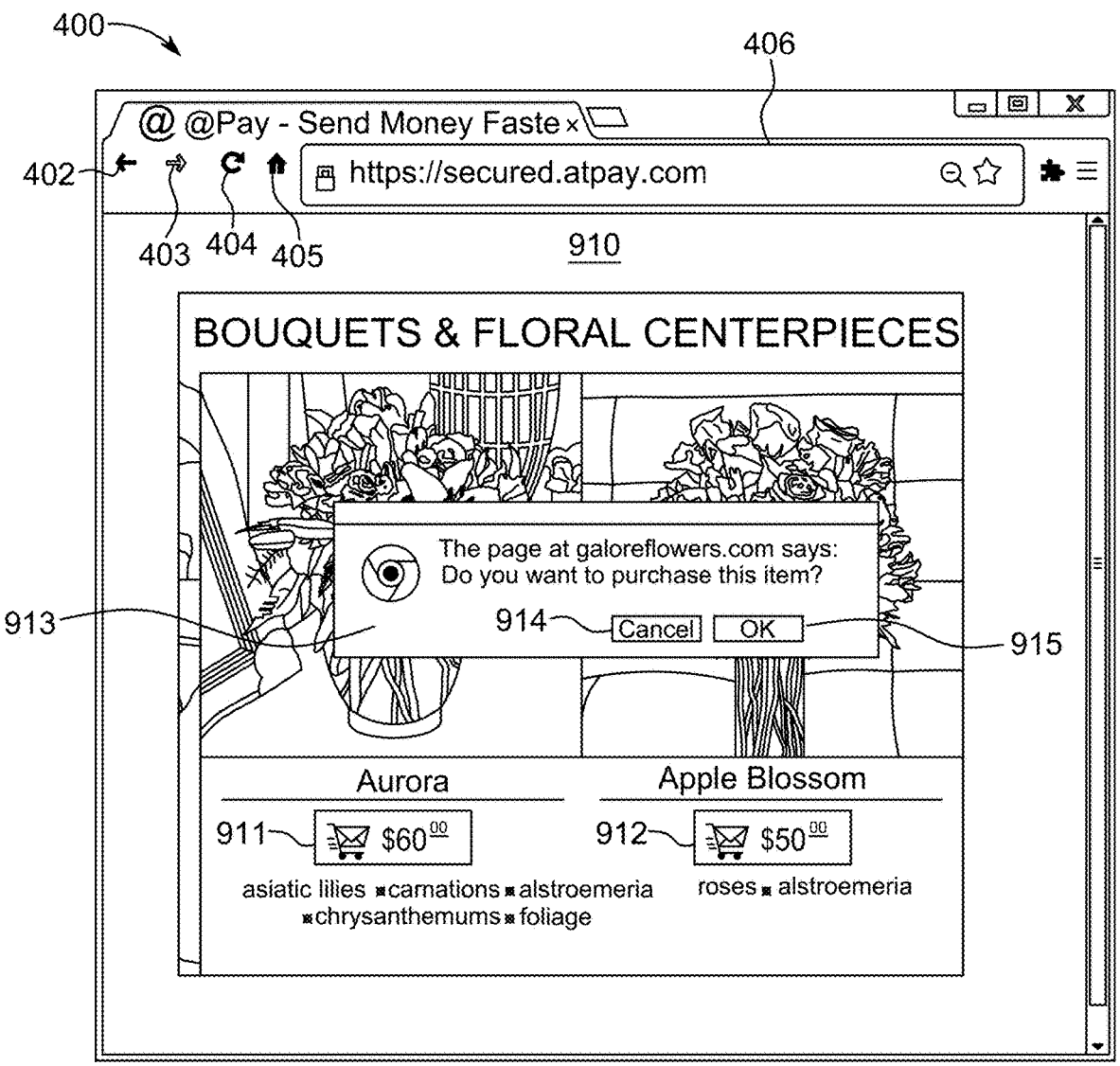
FIG. 9 is an example web page showing a customer device purchasing an item from a vendor server using the API.

FIG. 9 is an example web page 910 showing a customer device 150 purchasing an item from a vendor server 120 using the API. As shown in FIG. 9, the web page 910 may include input buttons 911 and 912. In the example shown, the customer has selected input button 911 to indicate interest in the Aurora flower available for sale. As the customer device 150 receives input for the input buttons 811 or 812, the web browser unit 155 may store one or more data structures that reflect the selections made in the input buttons. Further, as the selections are updated, the web browser unit 155 may update the web page 810 to indicate additional, or more specific, questions that may be associated with the selections. As shown in FIG. 9, the web browser unit 155 has opened a pop-up window 913, with input buttons 914 and 915. The pop-up window 913 allows the customer device 150 to confirm the purchase with input button 915 or cancel the purchase with input button 914.

Figure 10:
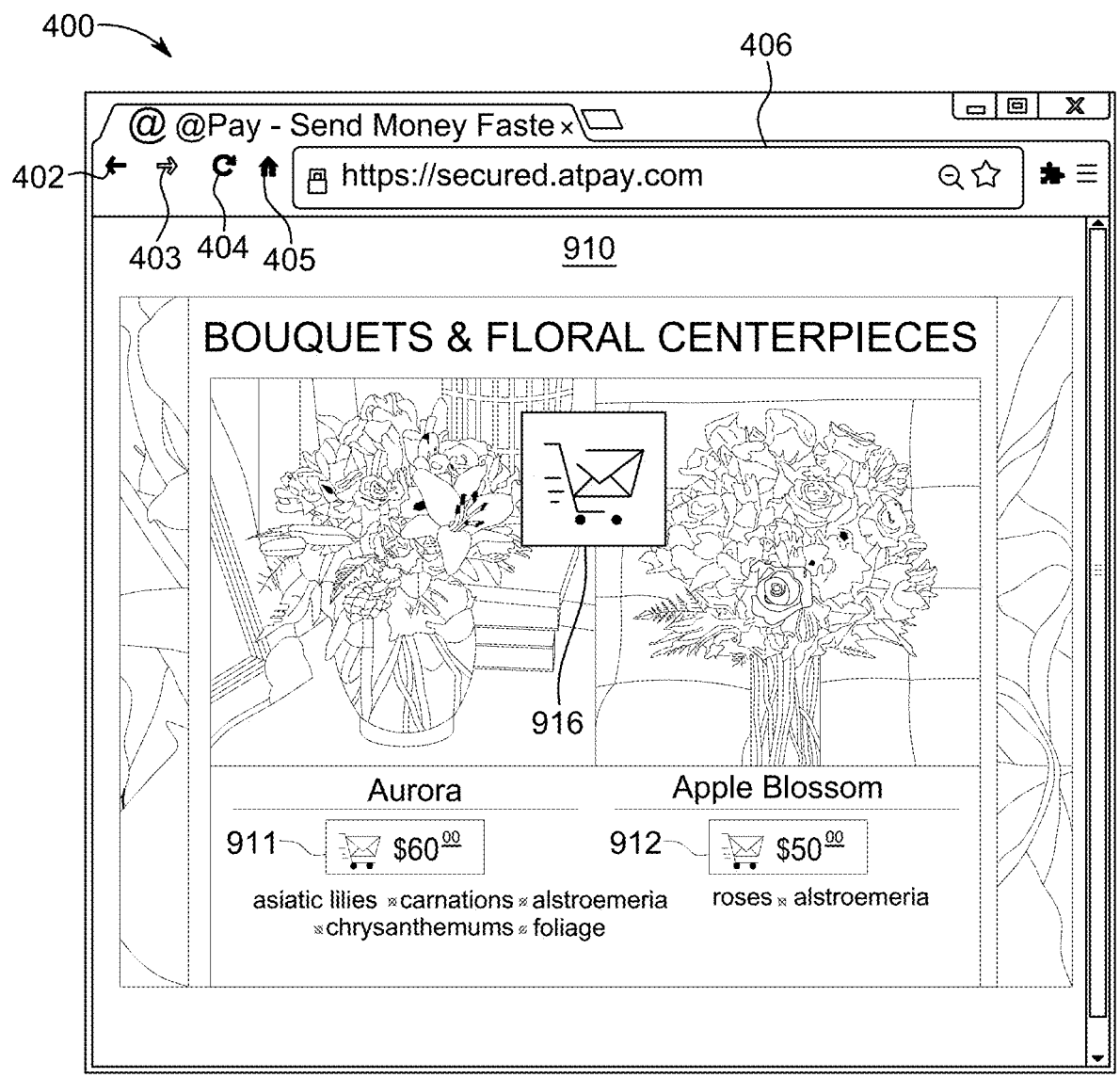
FIG. 10 is another example web page showing a customer device purchasing an item from a vendor server using the API.

FIG. 10 is another example web page 910 showing a customer device 150 purchasing an item from a vendor server 120 using the API. In the example shown, the customer selected input button 915 to confirm the purchase of the Aurora flower in FIG. 9. As shown in FIG. 10, the web browser unit 155 has updated web page 910 to show status indicator 916. Status indicator 916 notifies the customer that the email checkout system, operated by the API has been engaged.

Figure 11:
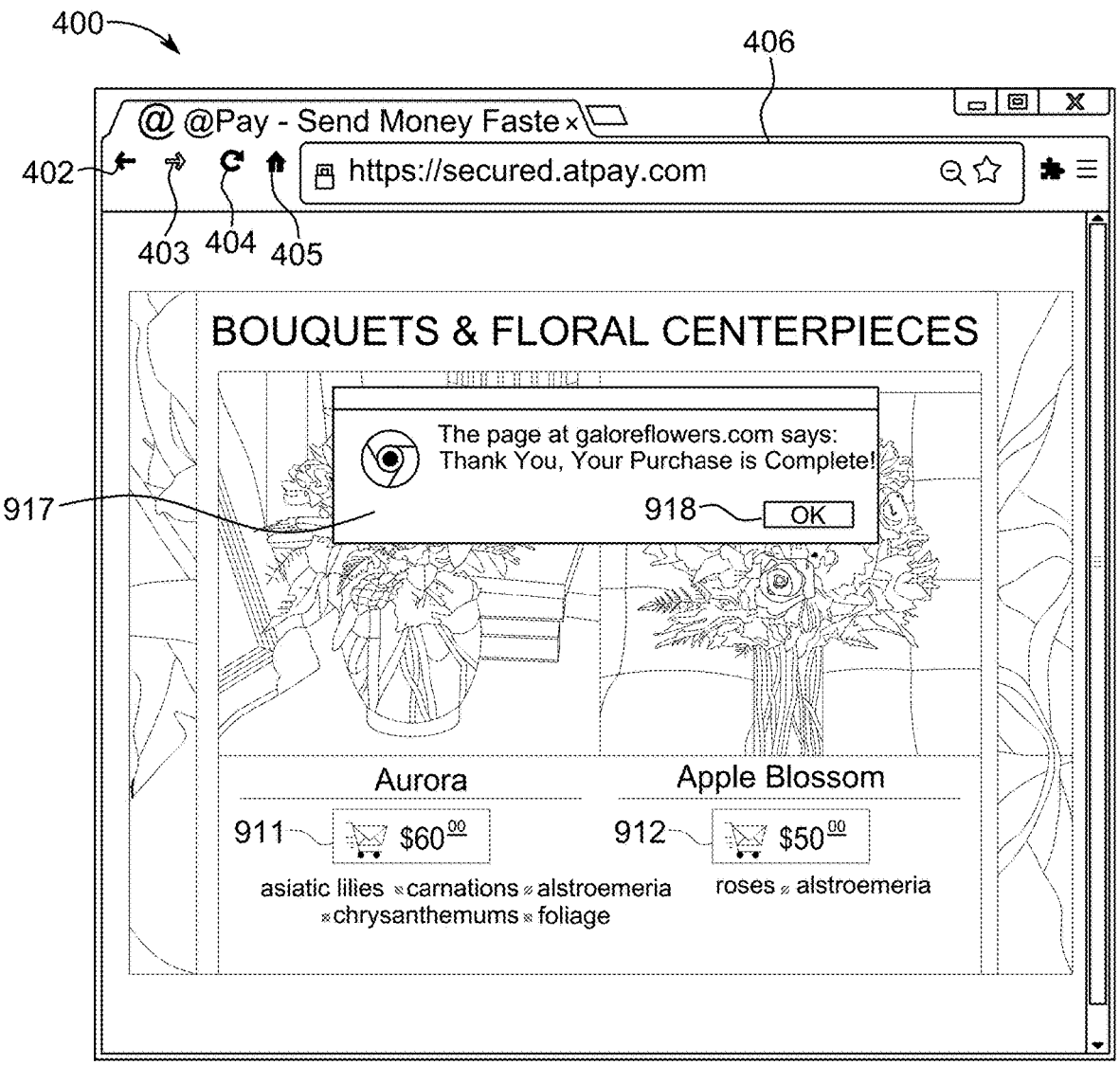
FIG. 11 is another example of web page showing a customer device purchasing an item from a vendor server using the API.

FIG. 11 is another example of web page 910 showing a customer device 150 purchasing an item from a vendor server 120 using the API. In the example shown, the customer has previously selected input button 915 to confirm the purchase of the Aurora flower in FIG. 9. As shown in FIG. 11, the web browser unit 155 has opened a pop-up window 917, with input button 918. The pop-up window 917 confirms that the vendor server 120 was able to communicate with the payment server 140 to purchase the selected item. In this scenario, a customer may receive an offer email that may be generated by the vendor server 120. Or the vendor server 120 may generate an offer via a website. When a customer completes a transaction, as shown in FIG. 11, either the vendor server 120 or the payment server 140 may generate a receipt email to the customer, based on preference settings.

To perform a transaction, such as the transaction showed in FIGS. 8-11, an application may generate a "client" record for each of its environments. The vendor server 120 copies keys for each client and securely stores them for later use in application development.

A vendor logs in and creates a client, this may allow them begin processing authentications.

Once the vendor server 120 has created a client, customers, operating customer devices 150 connect their accounts to a vendor server's 120 application e.g. via OAuth 2.0. This may allow the payment server 140 to make basic account information, such as the information entered in input fields 411, 511-515, and 611-612 to be available to the vendor server 120.

This basic information may be available to the vendor server 120 by transmitting a request. This request may be, e.g. "GET /api/account/show". To prevent unauthorized requests, the request may require an access token.

The payment server 140 may respond as follows:

```
{
  "email": "api@atpay.com",
  "username": "api@atpay.com",
  "name": "API User Example",
  "first_name": "API User",
  "last_name": "Example",
  "avatar": "https://secure.atpay.com/images/missing_avatar_small.png"
}
```

The following parameters may be entered in a request:

| Param name | Description |
| --- | --- |
| oauth_token required | The Access Token corresponding to the user you wish to get info for. Value: String |

Referring back to FIGS. 9-11, input buttons 911 and 912 are examples of payment buttons. The payment button is the nucleus of @Pay's technology. When included in an outgoing email to a member, it packages the two-click transaction and enables seamless email checkout from within the customer's email client. When included in an outgoing email to a non-member, it provides the ability to quickly sign up with the payment server 140 and process a transaction with a vendor server 120 through the web interface. The API enables the vendor server 120 to generate payment buttons for inclusion in outgoing emails. The API allows the vendor server 120 to create HTML Payment Buttons. This endpoint requires the 'buttons' scope. To create a button, the API associated with the vendor server 120 may generate a request from the payment server 140. A request may include the following parameters: access token, amount, and email.

An example scenario is shown below. In this scenario bob@test.com has an account with the payment server 140 while tim@test.net does not.

An example response, when a request for a button sent is as follows:

```
[
  { "email": "bob@test.com", "amount": "20.00", "button": <key_button> },
  { "email": "tim@test.net", "amount": "20.00", "button": <link_button> }
]
```

The difference between a key_button and a link_button is the interpolation of {{url}} in the Button Template. A key_button {{url}} is replaced with a mailto link, while a link_button puts a regular link in the {{url}} spot.

The API at the vendor server 120 may generate mailto links for any email address associated with a customer account with the payment server 140. Any address that is not identified by the payment server 140 generates a link which may be used to make a purchase, but the customer is directed to the payment server 140 website to complete the purchase and sign up.

Parameters associated with a button generated by the API may include the following:

| Params | |
| --- | --- |
| Param name | Description |
| amount | For example, the amount of the transaction |
| email | A list of email addresses that will be receiving the message. |
| oauth_token | The Access Token ID corresponding to the user you wish to build buttons for. |

As discussed above, the API may include an authorization procedure. For example, the API may use OAuth2 for authorization and authentication to all available endpoints.

The vendor server 120 may include an application to create a client record on the payment server 140, granting it API access and identifying it with a pair of cryptographic signatures. The vendor server 120 may create multiple client records for each environment in the application.

A customer, using a customer device 150 may access the vendor server 120 via a website. The customer connects their account with the vendor server's 120 application, granting the vendor server 120 the ability to take action on behalf of the customer part over resources stored at the payment server 140. This action may be similar to the "Log in with" options provided by services such as GOOGLE, FACEBOOK and GITHUB. The vendor server's 120 application begins this authentication process by redirecting to the authorization endpoint with information about the client record identification, and predetermined redirect URLs. The vendor server's 120 authorization client library (e.g. OAuth 2.0) may perform the generation of this authorization URL.

If the customer is a registered with the payment server 140, but not logged in, they will be prompted to do so. After successfully authenticating customer credentials, the customer may be redirected to another page on the payment server's 140 website where the customer will be prompted to enter an input to either Accept or Deny an application access to the scopes the vendor server 120 requested. After selecting an option, customer is redirected back to the vendor server 120, and the vendor server 120 may request an authorization token with the code sent by the payment server 140 in the redirect. This token is used in subsequent requests by the vendor server 120 application to access the payment server's 140 API endpoints.

The life of the token may not be related to the session state of the customer. The customer may log in or out of the payment server 140 or the vendor server 120 application and not affect the usability of the token itself. This allows the vendor server 120 to perform requests with this token in scheduled tasks and background processes.

The payment server 140 API may be configured to allow a vendor server 120 to refresh a token when it expires, and handle invalid token requests with authorization on part of the customer.

An API core controlled by the processor 124 may generate a security key that may be as a mailto link. The key is validated based on whether it matches the email that it came from, and is tied to no transaction or workflow. Its validation is just a validation, and is not related to a transaction—it may provide the ability to process a two-click e-commerce transaction. The key may be linked to autopilot or built into one or more applications.

Figure 12:
FIG. 12 shows an example email generated by a vendor server using the API.
Figure 12:
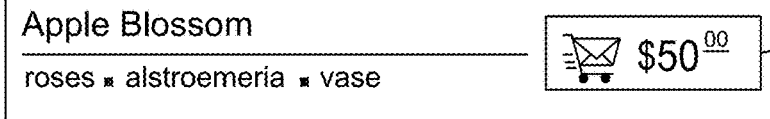
Figure 12:
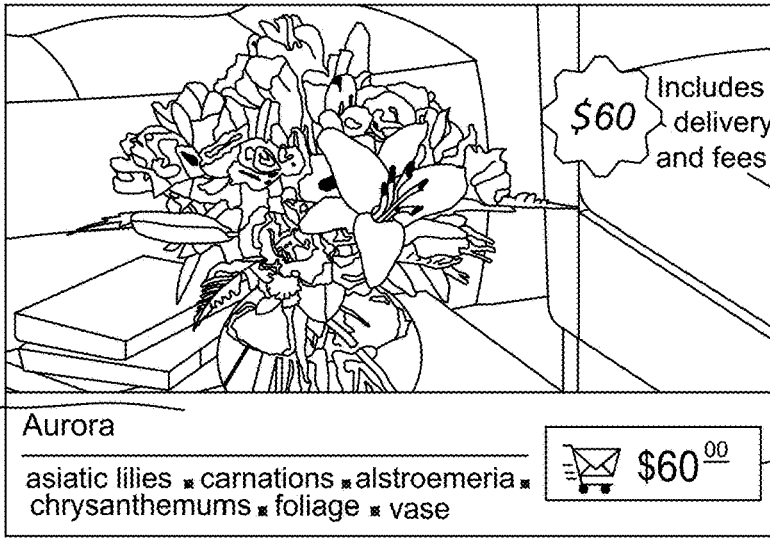

FIG. 12 shows an example email generated by a vendor server 120 using the API. As described above, the API allows a vendor to request two-click payment buttons 1211 and 1221 for inclusion in an HTML formatted email message 1200. As shown in FIG. 12, the email message 1200 includes an email header 1202 which includes "from", "subject", "date", "to" and "reply-to" fields. The email includes two offers, an offer for an apple blossom 1210 and an offer for an aurora 1220. Each offer has an associated payment button 1211 and 1221. Payment buttons 1211 and 1221 may each be embedded with a link that includes a token. The token may include information identifying the product and purchase price of the offer it is associated with. By selecting pay button 1211 or 1221 an email client associated with the customer device 150 may generate a response email that is addressed to the payment server 140. The response email may include information allowing the payment server 140 to complete the transaction, including a token and information from the email header 1202.

While the examples described herein show a customer device 150 accessing the e-commerce features using a web browser, it should be understood that this is just one example. The methods described herein may be performed by different types of customer devices 150 such as a mobile phone, tablet, personal computer etc. The customer device 150 may perform e-commerce transactions using, e.g., a web browser, an app, a program installed on a personal computer, etc.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or Bluray-Disc, or other type of device for electronic data storage.

Although the methods and features described above with reference to FIGS. 2-12 are described above as performed using the example system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-12 may be used alone without the other features and elements or in various combinations with or without other features and elements. Sub-elements of the methods and features described above with reference to FIGS. 1-12 may be performed in any arbitrary order (including concurrently), in any combination or sub-combination.

What is claimed is:

1. A method for improving security of an e-commerce network using Simple Mail Transfer Protocol (SMTP), the method comprising:
   transmitting a request to perform a transaction to a server, wherein the request identifies a user e-mail address of a registered user;
   receiving a mailto link from the server, wherein the mailto link is generated based on a determination of whether the registered user has authorized the server to perform the transaction;
   displaying the mailto link wherein the mailto link when activated generates an e-mail message that is sent to the server and contains a token for the transaction;
   receiving a confirmation message from server, wherein the confirmation message is generated in response to the server successfully completing the transaction based on the token contained in the e-mail message received by the server; and
   displaying an indication that the transaction was successfully completed by the server in response to the confirmation message.

2. The method of claim 1, wherein the token is an encrypted string and is embedded in the e-mail message.

3. The method of claim 1, wherein the method is performed by a vendor server that hosts an online retail website.

4. The method of claim 1, wherein the method is performed by a vendor server that hosts a non-profit organization and the transaction includes at least one item to be purchased or a donation to the non-profit organization.

5. The method of claim 1, wherein the confirmation message is received using an application programming interface (API).

6. A system for improving security of an e-commerce network using Simple Mail Transfer Protocol (SMTP), the system comprising:
a memory that stores customer information;
a communication interface that is communicatively coupled to a vender server via the e-commerce network;
a processor that is communicatively coupled to the memory and the communication interface, wherein the processor is configured to:
transmit, using the communication interface, a request to perform a transaction to server, wherein the request identifies a user e-mail address of a registered user,
receive, using the communication interface, a mailto link from the server, wherein the mailto link is generated based on a determination of whether the registered user has authorized the server to perform the transaction,
display, using the communication interface, the mailto link, wherein the mailto link when activated generates an e-mail message that is sent to the server and contains a token for the transaction;
receive, using the communication interface, a confirmation message from the server, wherein the confirmation message is generated in response to the server successfully completing the transaction based on the token contained in the e-mail message received by the server, and
display an indication that the transaction was successfully completed by the server in response to the confirmation message.

7. The system of claim 6, wherein the token is an encrypted string and is embedded in the e-mail message.

8. The system of claim 6, wherein the system is vendor server that hosts an online retail website.

9. The system of claim 6, wherein the system is vendor server that hosts a non-profit organization and the transaction includes at least one item to be purchased or a donation to the non-profit organization.

10. The system of claim 6, where the confirmation message is received using an application programming interface (API).

11. The system of claim 6, wherein the server completes the transaction by:
performing a validation of a sender address by using at least one of DomainKeys Identified Mail (DKIM) or Sender Policy Framework (SPF)
wherein the sender address is an address from which the e-mail message is received.

12. A non-transitory computer-readable storage medium storing instructions for improving security of an e-commerce network using Simple Mail Transfer Protocol (SMTP), the instructions when executed by a processor causes the processor to perform a method comprising:
transmitting a request to perform a transaction to a server, wherein the request identifies a user e-mail address of a registered user;
receiving a mailto link from the server, wherein the mailto link is generated based on a determination of whether the registered user has authorized the server to perform the transaction;
displaying the mailto link wherein the mailto link when activated generates an e-mail message that is sent to the server and contains a token for the transaction;
receiving a confirmation message from server, wherein the confirmation message is generated in response to the server successfully completing the transaction based on the token contained in the e-mail message received by the server; and
displaying an indication that the transaction was successfully completed by the server in response to the confirmation message.

13. The method of claim 1, wherein the server completes the transaction by:
performing a validation of a sender address by using at least one of DomainKeys Identified Mail (DKIM) and Sender Policy Framework (SPF)
wherein the sender address is an address from which the e-mail message is received.

14. The non-transitory computer-readable storage medium of claim 12, wherein the server completes the transaction by:
performing a validation of a sender address using at least one of DomainKeys Identified Mail (DKIM) or Sender Policy Framework (SPF)
wherein the sender address is an address from which the e-mail message is received.

* * * * *